United States Patent [19]
Ronzani et al.

[11] Patent Number: 5,844,656
[45] Date of Patent: *Dec. 1, 1998

[54] HEAD MOUNTED DISPLAY WITH ADJUSTMENT COMPONENTS

[75] Inventors: Peter A. Ronzani, Los Gatos, Calif.; Michael D. Jenkins, Manassas; John W. Williams, Clifton, both of Va.

[73] Assignee: Xybernaut Corporation, Fairfax, Va.

[*] Notice: The term of this patent shall not extend beyond the expiration date of Pat. No. 5,757,339.

[21] Appl. No.: 745,013

[22] Filed: Nov. 7, 1996

[51] Int. Cl.⁶ .................. G02C 1/00; G09G 3/02
[52] U.S. Cl. .................. 351/158; 345/7; 345/8
[58] Field of Search .............. 351/158, 41, 156; 381/183, 184, 188; 345/8, 7; 348/121, 795, 61

[56] References Cited

U.S. PATENT DOCUMENTS

| | | |
|---|---|---|
| D. 371,549 | 7/1996 | Ronzani . |
| 5,003,300 | 3/1991 | Well . |
| 5,162,828 | 11/1992 | Furness . |
| 5,321,416 | 6/1994 | Bassett et al. ............... 345/8 |
| 5,457,751 | 10/1995 | Such ......................... 381/183 |
| 5,757,339 | 5/1998 | Williams et al. ............ 345/8 |

FOREIGN PATENT DOCUMENTS

WO9511473 4/1995 WIPO .

Primary Examiner—Hung Xuan Dang
Attorney, Agent, or Firm—James J. Ralabate

[57] ABSTRACT

This novel Head Mounted Display (HMD) has a removable communications unit which can be interchangeably worn on the right or left side of the user. Thus, users having a hearing deficiency in one ear can use the opposite ear. Also, the HMD has a fully adjustable eyepiece which can be swung out of the way when not in use or can be used adjacent either eye. An important feature of this invention is an eye guard which prevents the eyepiece from striking the user's eye or face portion.

7 Claims, 9 Drawing Sheets

HEAD MOUNTED DISPLAY WITH ADJUSTMENT COMPONENTS

This invention relates to a novel head mounted display means and, more specifically, to a head mounted display unit particularly suitable for use in a voice activated, body worn computer system.

BACKGROUND OF THE INVENTION

There are known various head mounted viewing systems for viewing a plurality of displays. Some of these prior art display units are disclosed in U.S. Pat. Nos. 5,003,300; 5,162,828; Des. 371,549 and in PCT International Publication No. WO95/11473 published Apr. 27, 1995. Each of the systems described involve a head mounted display connected to a remote or other signal source for providing the subject matter to be displayed.

In Wells U.S. Pat. No. 5,003,300 a head mounted display is disclosed which is connected to a remote signal source which may be a computer, pocket calculator or a radio wave transmitter which provides power, timing information and drawing signals necessary for driving the display. The system of Wells is not a voice activated system but rather one that relies upon stored information for driving the display. Thus, Wells does not contain voice activation means in the head mounted display.

The Furness patent U.S. Pat. No. 5,162,828 discloses a display system for conventional eyewear using a transparency. The display system of Furness includes a light transmissive display mounted on the frame of the eyewear and optics for collimating light to project an image of the displayed information at a distance from the user in the periphery of the field of view defined by the transparency. It is important to the Furness head mounted display that there be included a mirror means for collimating light to project the image. Again, Furness' system is not designed for use in or with a voice activated computer system.

The Ronzani design patent U.S. Pat. No. Des. 371,549 illustrates a head mounted display system having a movable eyepiece or cell that appears to be capable of both horizontal and vertical adjustment. Nothing in Ronzani, however, suggests use of his head mounted display system in a voice activated computer system.

The WO95/11473 publication (Kopen) dated Apr. 27, 1995 discloses a multitude of head mounted display configurations. In some of the embodiments disclosed by Kopen the display is connected to a video or information source such that the user can view information or images shown on the display. In one of Kopin's embodiments, the display can be mounted to a frame so that the user can move the display in and out of the user's field of view. Some of the illustrations in Kopin present a head mounted display containing earphones and a microphone connected to or integral therewith. The microphone is used to convey voice activation commands to the computer for ultimate transmission to the display means used. In Kopen the earphones are hinged to the head band 512 and attached to one of the earphones as a microphone arm 690 having a microphone 559 attached at its distal end. It is important to note that Kopin uses two earphones, both of which are permanently attached to the headset structure; see Kopin FIGS. 34A through 34D. The headset of these figures is clamped over the head and pressure exerted on each ear portion in order to hold the headset in place on the wearer's head.

There is therefore a need for a head display system, usable in or with voice activated computer systems that are as non-intrusive as possible, are compact, lightweight and fully adjustable.

SUMMARY OF THE INVENTION

It is therefore an object of this invention to provide a head mounted display (HMD) that is devoid of the above noted disadvantages.

Another object of this invention is to provide a HMD that is lightweight, compact, easy to use and has a removable communication system.

Still a further object of this invention is to provide a HMD that contains only the essential components necessary, resulting in an extremely lightweight system.

Yet another object of this invention is to provide a HMD that can be conveniently used by both right- and left-handed users.

A further object of this invention is to provide an adjustable HMD that is designed to be comfortably worn over a long period of time.

Still a further object of this invention is to provide a novel HMD that can be easily used by users having a better functioning eye or ear.

These and other objects of this invention are accomplished by a novel HMD usable in voice activated computer systems having an adjustable headband. At the front portion of this adjustable headband is a movable eyepiece or cell having means to move horizontally, ie., from one eye to the other, and having means to move vertically ie., pivot closer or farther from the wearer's eye. On a side of the headband is a removable communication unit that contains the earpiece and the microphone. Both the earpiece and the microphone have simple adjusting means to place each nearer or farther from the user. Since one of the major considerations for a headset (that will be worn for a considerable time) is its weight, any feature that reduces the weight is important. One way to reduce the weight is to use lightweight materials; another way is to reduce the number of components in the headset. The head mounted display of this invention comprises an adjustable headband for positioning on a user's head. Movably connected to said headband is a detachable communication unit and an adjustable eyepiece. The communications unit comprises a microphone and an earpiece and having means for detaching and attaching to either right or left of said headband. The adjustable eyepiece contains a display selected from the group consisting of light source transmission display, active electrolumenescent display, LED display, and reflective display. In the present invention one comparatively heavy component, ie., the earphone, is omitted from the headset. This is accomplished by providing a detachable earphone or earpiece that can be used on either side of the headset. By limiting the HMD to only one earpiece, the weight of the HMD is significantly reduced and more comfortable to wear without the clamping effect caused by two earpiece prior art units. Also, if the user has an impediment in one ear or in one eye, the HMD of this invention provides convenient means for usage with the better of the two eyes or ears. Therefore, the HMD of this invention is fully adjustable, having an adjustable headband, and adjustable eyepiece or cell and a removable communication unit wearable over either the right or left ear of the user. Each of these components is made from a very lightweight, substantially non-conductive material such as polymers, fiberglass, paper or any other suitable material. The headband may contain, if desirable, removable comfort pads that may be replaced when used by various users. Also, if desirable, there are means in one embodiment for attaching safety goggles or other eyewear to the HMD. Any suitable eyepiece or communication unit or other component may be used such as those disclosed in the prior art above cited. However, it should be noted that none of the above cited art disclose the novel features of this invention including the removable communication unit, adjustable headband, safety eye guard, and single removable earpiece.

DETAILED DESCRIPTION OF THE DRAWING AND PREFERRED EMBODIMENTS

Figure 1:
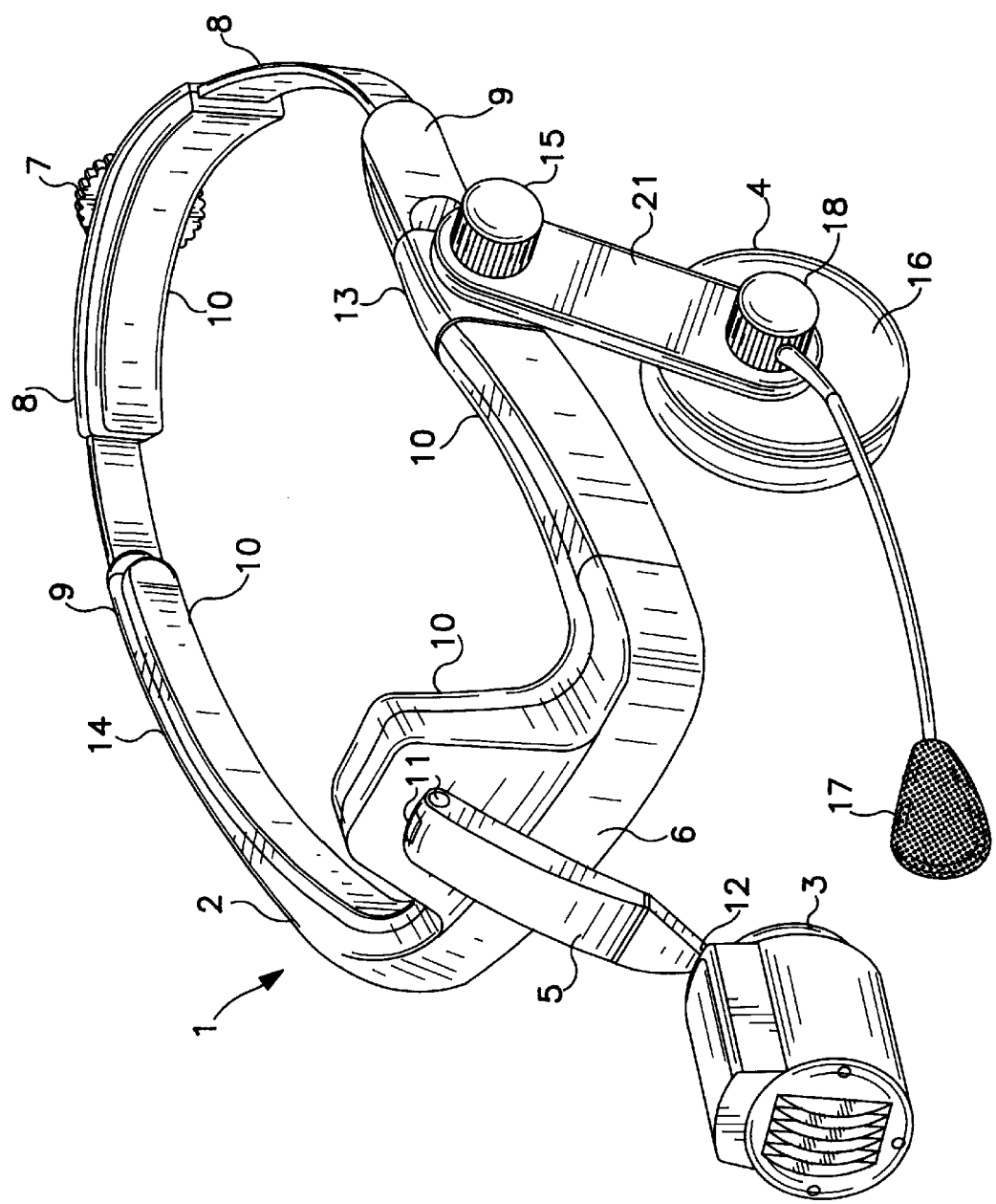
FIG. 1 is a side perspective view of the novel HMD of this invention.
Figure 2:
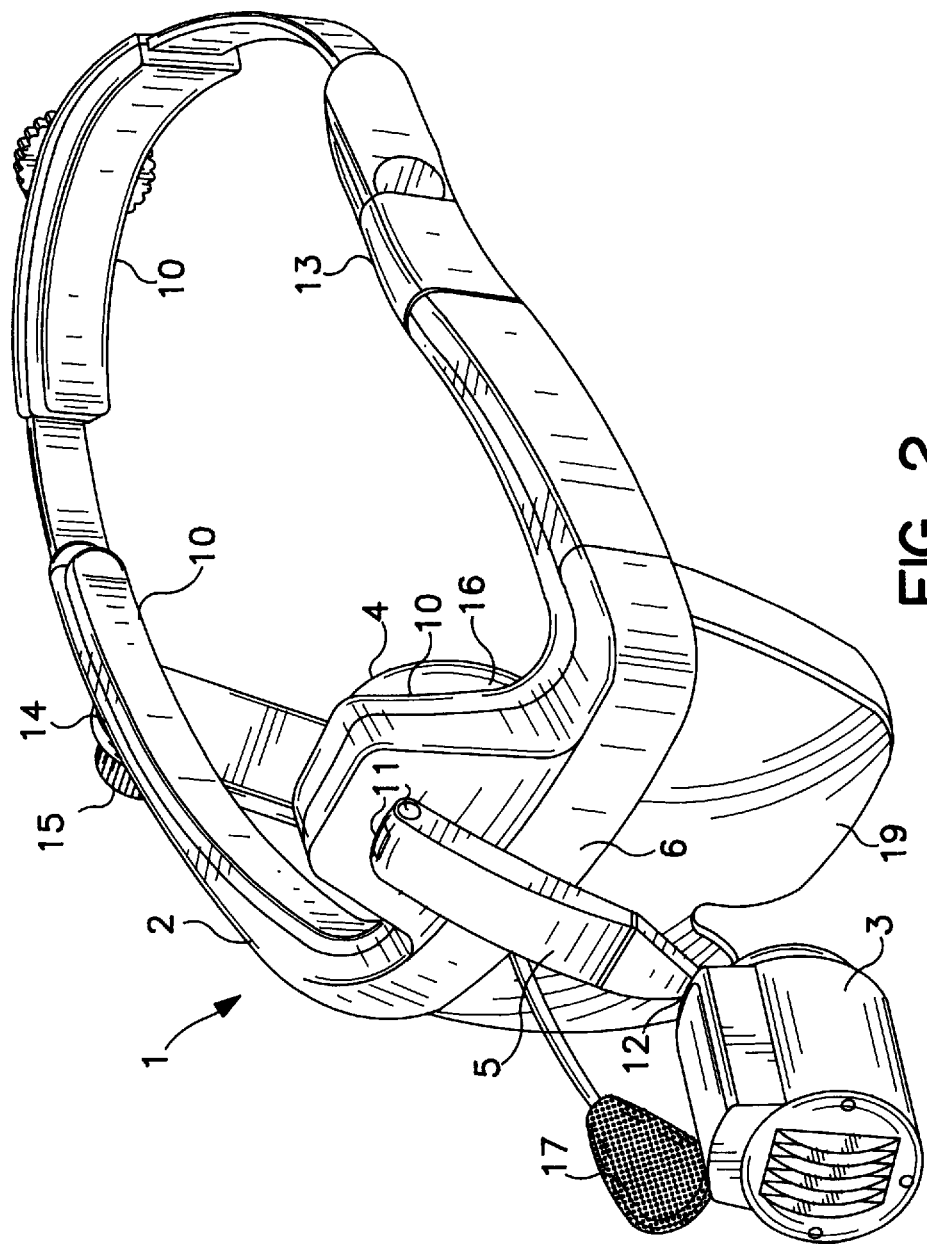
FIG. 2 is a side perspective view of the novel HMD of this invention having safety goggles attached thereto.

In FIG. 1, the novel HMD 1 of this invention comprises very lightweight components including a narrow headband 2, a pivotable eyepiece or cell 3, and a removable or detachable communication unit 4. The eyepiece 3 is attached to an expandable pivot arm 5 that is movably secured to the front of the headband 2. The pivot arm 5 is designed so that if a user hits an object or obstacle, the eyepiece 3 will move toward the user's face but will be prevented from hitting the user by the head or eye guard 6 (see FIG. 8). The pivot arm 5 when pressure is exerted upon it, will be prevented from further movement by contact with head or eye guard 6. This safety feature is a critical element of the present invention. The headband 2 has an adjusting means 7 which can be conveniently located at the rear portion of the headband 2. Rear headband section 8 is slidably adjustable into front headband section 9 to ensure that each user can comfortably wear the HMD unit 1. In the inner portion of headband 2 can be replaceable comfort pads 10 that can be used when different users use the same HMD 1. In the front portion of headband 2 is an eye guard section 6 to which the pivot arm 5 is movably attached. As above noted, when pivot arm 5 and cell 3 are moved toward the eye of the user, they are prevented from hitting the user's eye by eye guard 6. The pivot arm 5 can move the attached eyepiece or cell 3 away from or toward the eye of the user. Also the pivot arm can swing to a position adjacent the right eye or the left eye of the user. Also pivot arm 5 is extendable (as shown in FIG. 9) so as to be fully adjustable in all directions by the user; ie., from side to side laterally, from up or down vertically, and extendable to a maximum pivot arm length. Pivot connection means 11 permits arm 5 to move side to side over each eye, or outwardly away from the headband 2 or inwardly toward headband 2. Eyepiece 3 also has pivot means 12 attached to the lower section of arm 5. Eyepiece 3 in FIGS. 1 and 2 is swung to a position adjacent to the right eye of the user, but equally can be moved over or adjacent to the left eye of the user. Also, communication unit 4 is shown at a position adjacent to the left ear of a user but equally can be removed via attachment means 13 to be fitted on the headband 2 in a position (marked 14) on the opposite side of headband 2. A knob 15 or other easy to use means may be used to loosen or to tighten communication unit 4 to headband 2 on either the left or right side 14 of the headband. The communication unit 4 comprises an earpiece 16 and a microphone 17, each having connected thereto adjusting means 18 to raise or lower microphone 17 depending upon the needs of the user. Any suitable eyepiece 3, earpiece 16 or microphone 17, including those disclosed in the above cited prior art may be used in the HMD of the present invention, if suitable; the differences being the novel critical elements of this invention must be used with these prior art components.

In FIG. 2, the same embodiment as in FIG. 1 is shown except safety goggles 19 are shown attached to the headband 2 at its front section. Also, note that removable communication unit 4 is now positioned on the right side 14 of the headband 2.

Figure 3:
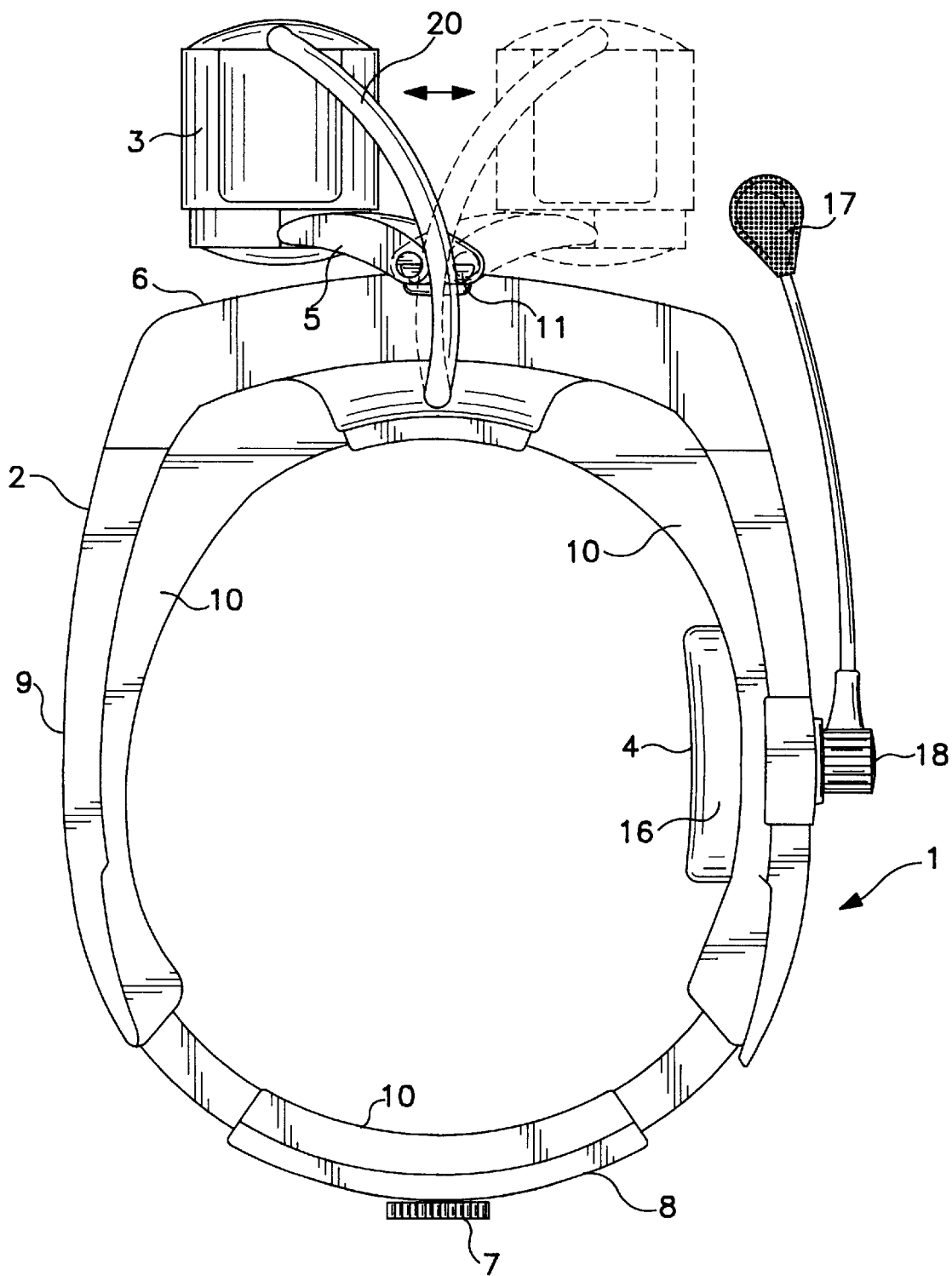
FIG. 3 is a top plan view of the novel HMD of this invention showing the eyepiece adjusted for use over the left eye of the user and the removable communication unit adjusted for use near the right ear of the user.

In FIG. 3, a top plan view of the HMD 1 of this invention is shown with eyepiece 3 in a position over the left eye of the user and the communication unit 4 in a position adjacent the right ear of the user. Also shown in FIG. 3 but not shown in FIGS. 1 and 2 is computer connection means 20 (or connection means at any other suitable location in the HMD) which electrically connects the HMD 1 with a signal source which may be a computer, processor or other means that provide an image for viewing by the HMD 1. Note also in FIG. 3 that eyepiece 3 and pivot arm 5 are close to the viewer's eye while in FIG. 4 eyepiece 3 and pivot arm 5 are moved away from the viewer's eye (or away from the eye guard 6).

Figure 4:
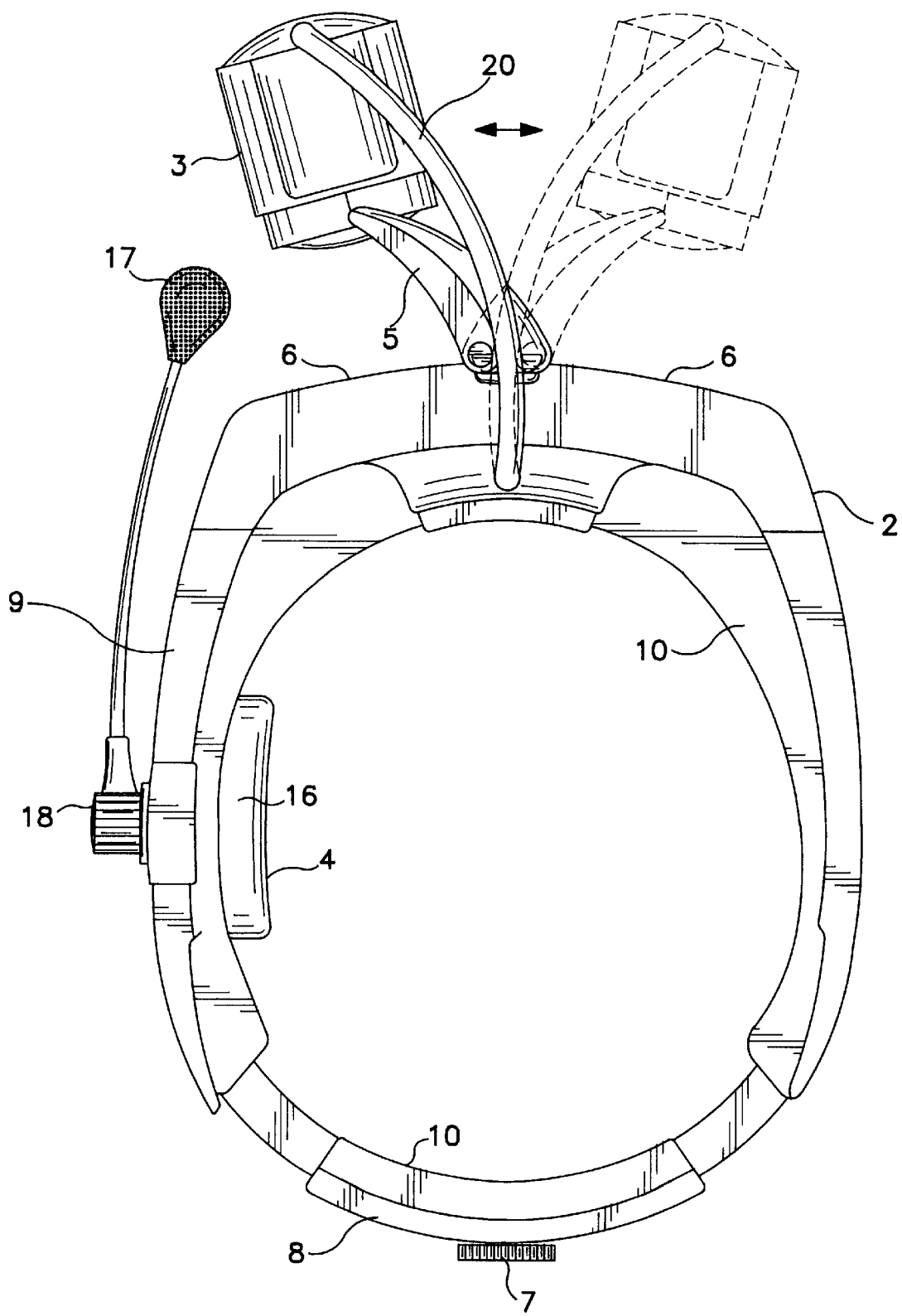
FIG. 4 is a top plan of the HMD of this invention showing the eyepiece in the left eye position and the removable communication unit in the left ear position.

Also in FIG. 4, communication unit 4 including earpiece 16 and microphone 17 are removed from the right side position of FIG. 3 and reattached to headband 2 on the left side of headband 2. This is another important and critical feature of this invention; adjustment knob 18 merely is loosened and the earphone 16 and microphone 17 are rotated 180° to a position usable on the opposite side of the headband 2. Arm 21 (see FIG. 1) connecting earpiece or earphone 16 to headband 2 may be rotated merely by loosening knobs 15 and 18 shown in FIGS. 1 and 2.

Figure 5:
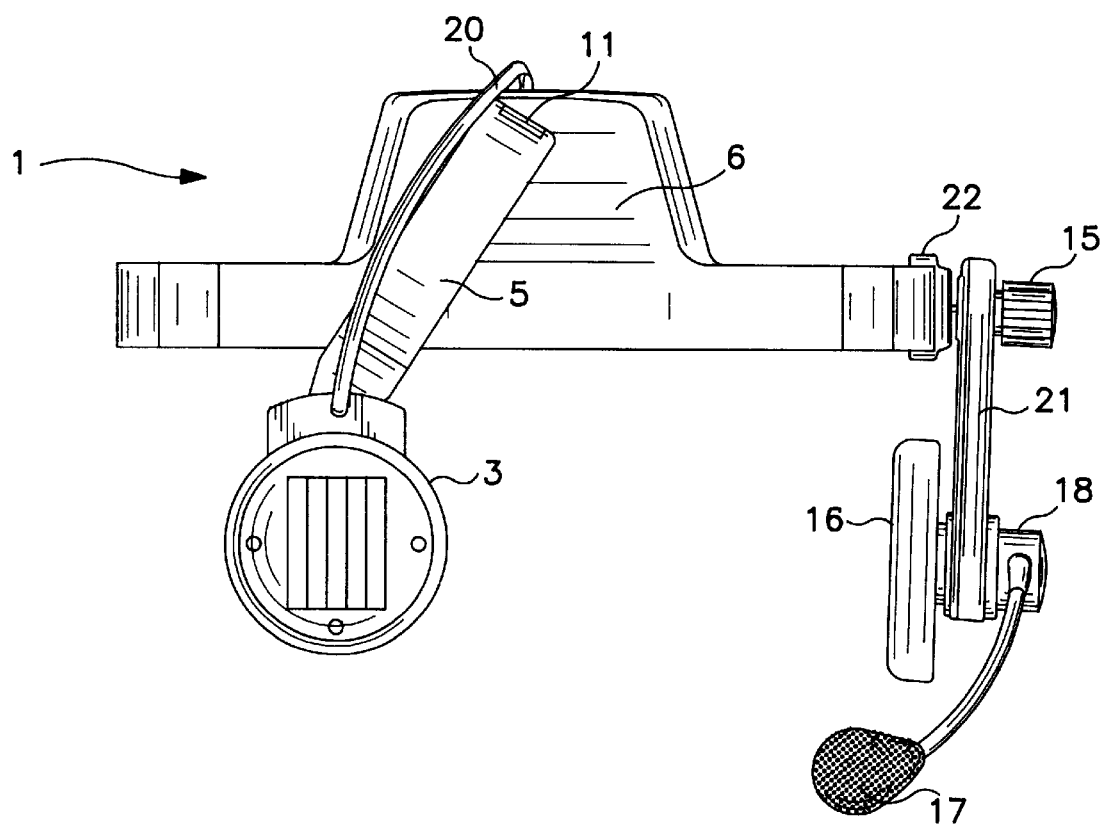
FIG. 5 is a front plan view of the HMD of this invention showing the eyepiece adjusted for use with the right eye of the user and the removable communication unit adjusted for use with the left ear of the user.

In FIG. 5, a front view of the HMD 1 is shown with the eyepiece 3 swung to a location adjacent the right eye and the removable communication unit 4 is located at a position that will be adjacent the left ear of the user when worn. Clamp 22 will fit equally on and lock to headband 2 on either the right or left side of headband 2.

Figure 6:
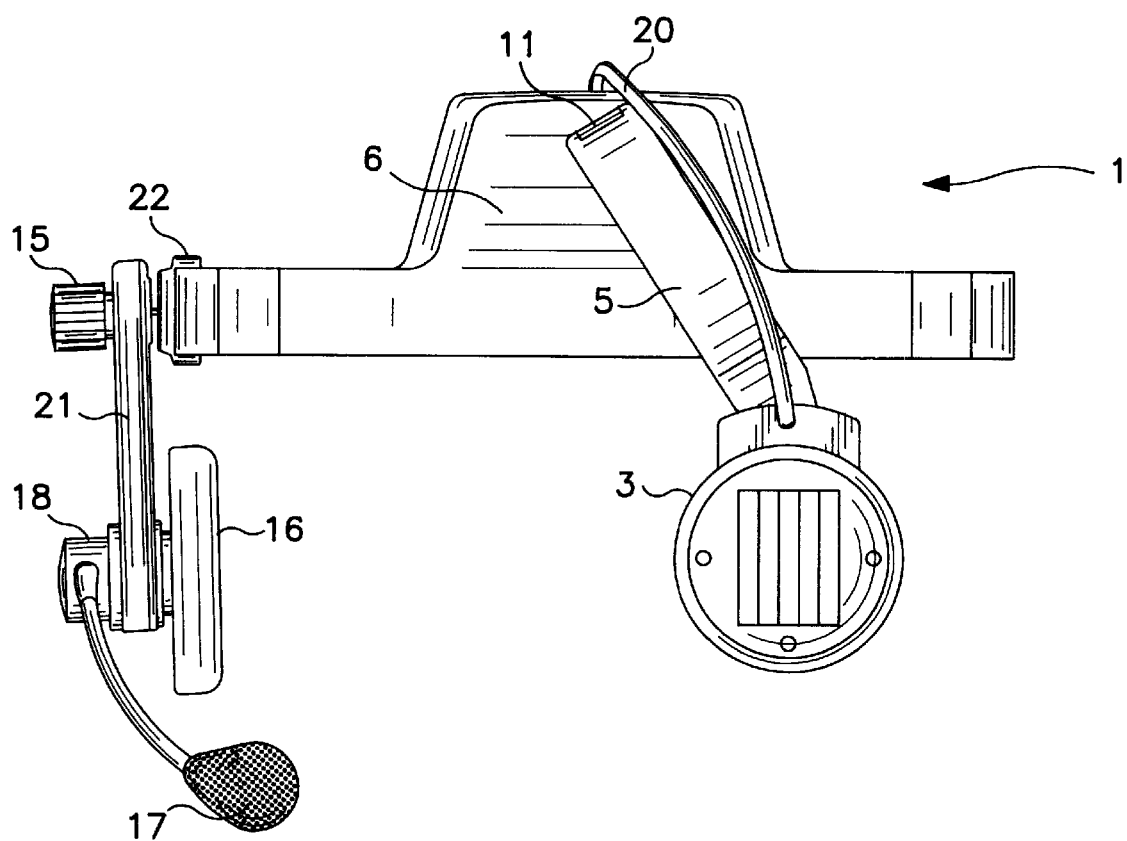
FIG. 6 is a front plan view of the HMD of this invention showing the eyepiece adjusted for use adjacent the left eye of the user and the removable communication unit positioned for use adjacent the right ear of the user.

In FIG. 6, removable or detachable communication means 4 including microphone 17 and earpiece 16 are moved and reattached to the headband 2 at a position that will be adjacent the right ear of the user when worn. Also, eyepiece 3 is swung to a position that will be adjacent the left eye of a user when worn.

Figure 7:
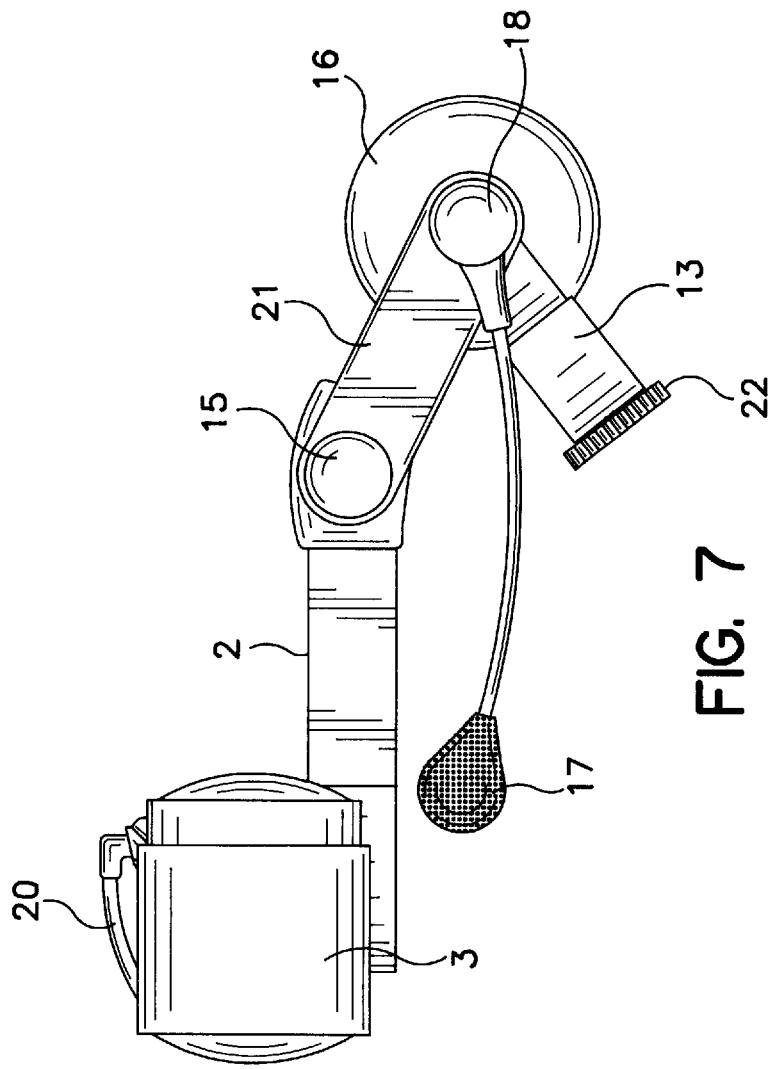
FIG. 7 is a side plan view showing the HMD of this invention in its folded or compacted position.

FIG. 7 shows the HMD unit 1 in a folded position convenient for storage or transporting from one location to another. The lightweight unit of this invention is not only convenient and non-intrusive to wear but is also compact and easy to carry or store.

Figure 8:
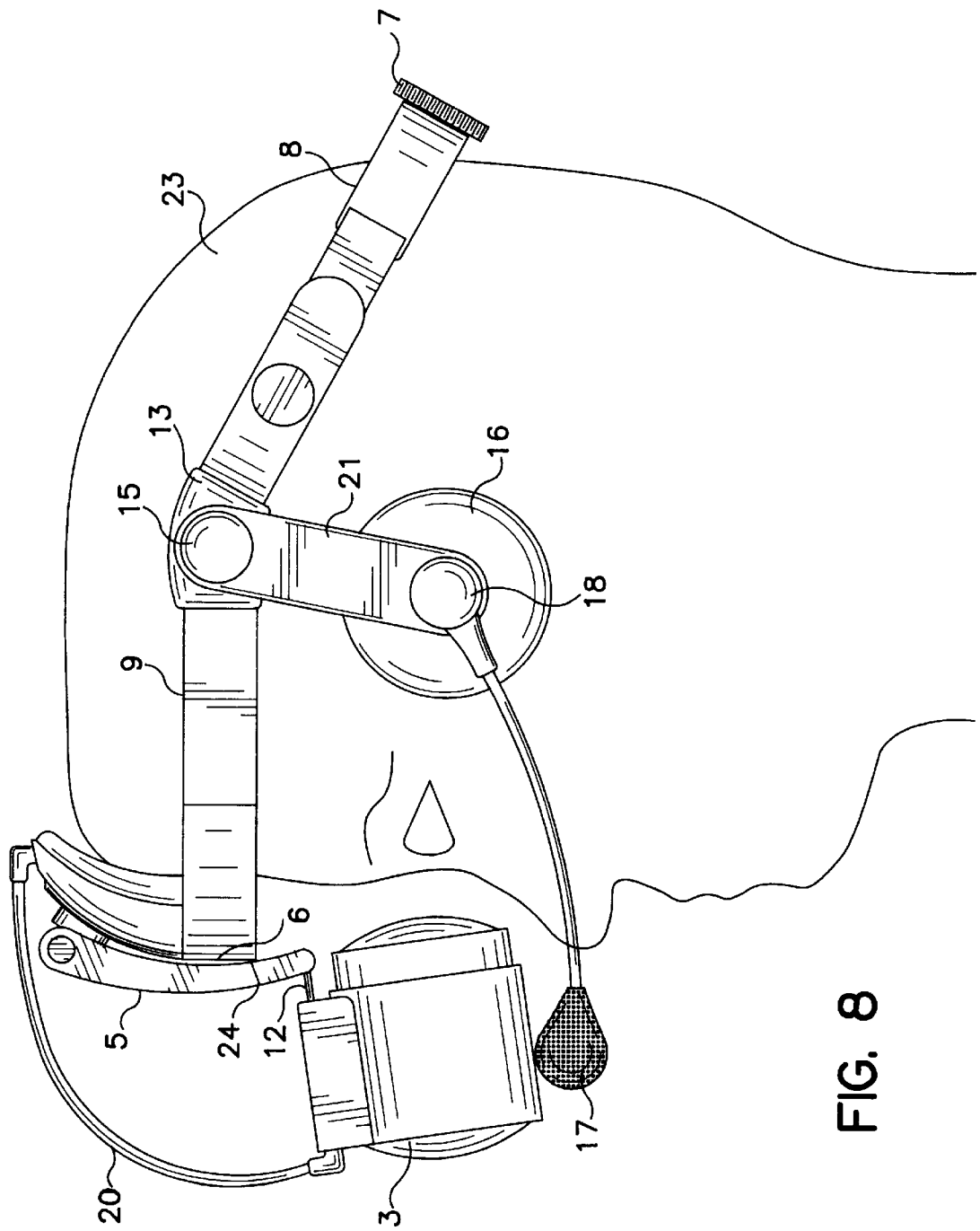
FIG. 8 is a side plan view showing the HMD of this invention with the eyepiece pivoted in a position close to the eye of the user.
Figure 9:
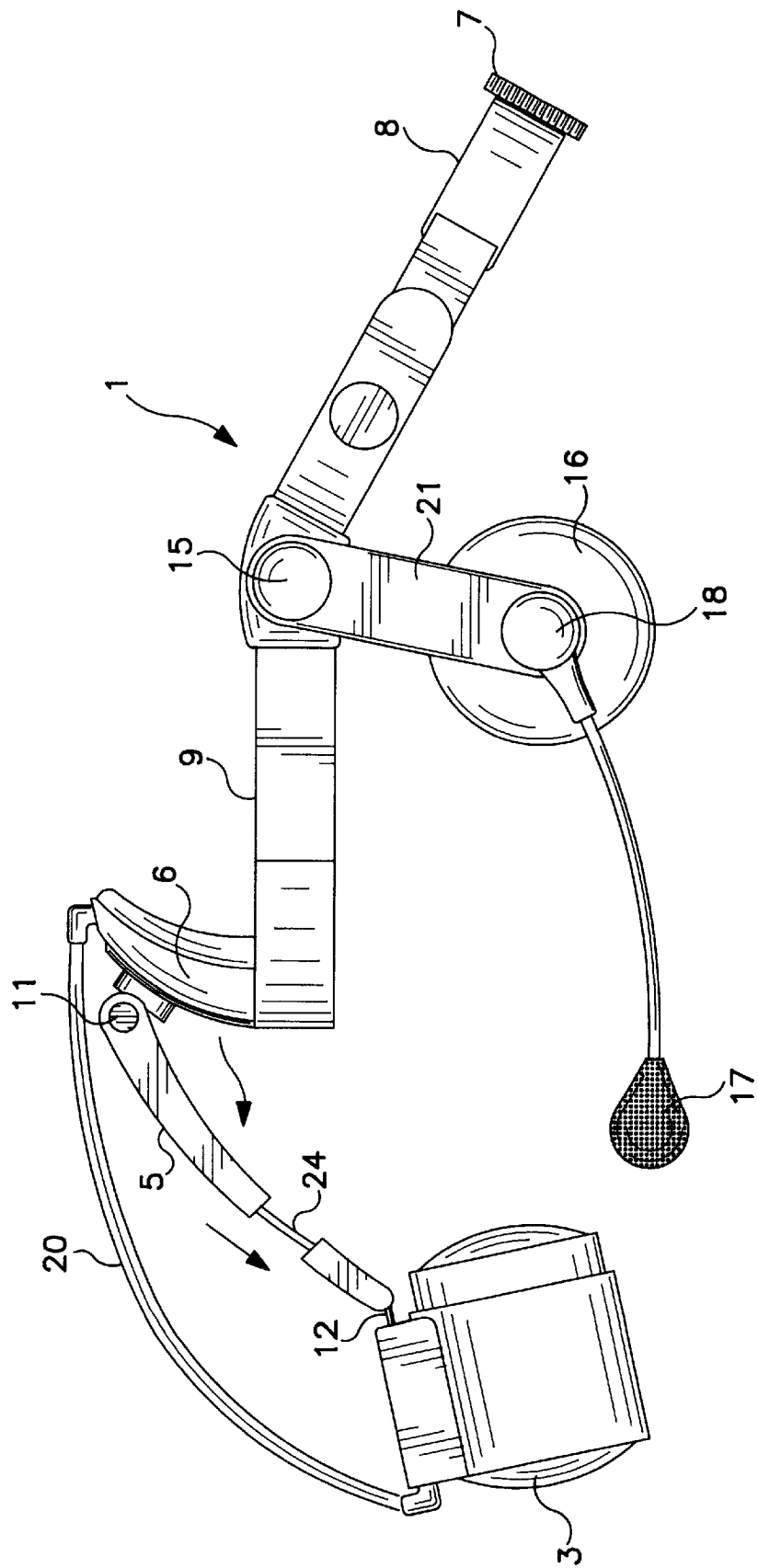
FIG. 9 is a side plan view showing the HMD of this invention with the eyepiece pivoted in a position away from the eye of the user.

In FIG. 8, a side plan view of the HMD 1 as worn on a user's head 23 is shown. Note that eye pivot arm 5 and eyepiece 3 even when pushed back to its maximum position toward the user 23 will not contact or harm the user since it will be prevented from doing so by guard piece 6. Eye pivot arm 5 is also shown compacted with telescoping section 24 closed.

In FIG. 9, the HMD 1 is shown with the arm 5 and eyepiece 3 away from the user's eye with telescoping section 24 open to permit maximum away distance for eyepiece 3. Also shown is eyepiece 3 adjustably lowered via eyepiece adjusting means 12 which can be any type of convenient means to move eyepiece 3 horizontal to the floor and parallel to headband 2 or at an angle to headband 2 as shown in this figure.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

I claim:

1. A head mounted display having means to encircle the entire head of a user, comprising an adjustable headband, a detachable communication unit and a pivotable eyepiece connected to a front center portion of said headband, said communication unit comprising an earpiece and a microphone and having means for attachment to either a right or left side of said adjustable headband, said eyepiece and an attached pivot arm having means to swing to a position adjacent a right eye or a left eye of said user, said eyepiece being attached to said pivot arm which in turn is attached to an eye guard section in a central section of said front portion of said headband, and wherein said pivot arm when moved toward a user has means to contact said eye guard and prevent said adjustable eyepiece from contacting a body portion of said user.

2. The display of claim 1 wherein said detachable communication unit has adjusting means for said earpiece and said microphone.

3. The display of claim 1 wherein said adjustable eyepiece has both horizontal and vertical adjusting means.

4. The display of claim 1 wherein said display has a display cell and connecting means to an optical system for generating an image to be viewed.

5. The display of claim 1 wherein said display has electrical connections to a computer or processor for generating a displayable image to said display.

6. The display of claim 1 wherein said display is a component of a voice activated, body-worn computer system.

7. The display of claim 1 wherein said eyepiece contains a display selected from the group consisting of light source transmission display, active matrix electrolumenescent display, LED display, and reflective display.

* * * * *